United States Patent Office 3,739,059
Patented June 12, 1973

3,739,059
PROCESS FOR PREPARING HYDRAZINIUM DIPERCHLORATE
Marvin M. Fein, Westfield, and John E. Paustian, Whippany, N.J., assignors to Thiokol Chemical Corporation, Bristol, Pa.
No Drawing. Filed July 21, 1965, Ser. No. 473,860
Int. Cl. C01b 21/52
U.S. Cl. 423—386
5 Claims This invention relates to an improved process for preparing hydrazinium diperchlorate economically and substantially free from decomposition products.

More particularly, this invention concerns a new process for preparing hydrazinium diperchlorate without the use of perchloric acid.

Hydrazinium diperchlorate in its anhydrous form is an exceedingly energetic oxidizer. In addition to its exceptional potency, it has certain other advantages which would make it desirable as an oxidizer in solid propellant compositions. These advantages include high density, a high burning rate and relatively low sensitivity toward detonation from shock.

Hydrazinium diperchlorate is commonly prepared by neutralizing hydrazine free base with concentrated perchloric acid. Since the reaction is between a strong acid and a strong base, it is strongly exothermic and requires considerable cooling to safely prepare the hydrazinium diperchlorate product. In spite of these precautions, substantial amounts of hydrazinium diperchlorate decomposition products inevitably contaminate the product. Where hydrazinium diperchlorate is to be used as a propellant oxidizer, exceedingly close control of these decomposition products is necessary. The reason for this is that many of the decomposition products are unstable to elevated temperatures and vibrational shock. An ancillary disadvantage of the "perchloric acid" type of process is that the starting material, perchloric acid, is costly and of limited supply. The high cost of perchloric acid adds to the cost of an already expensive final product, while the limited supply of the acid can cause supply problems in a national emergency.

Because of the shortcomings of the prior art neutralization processes, a process which does not require the use of perchloric acid in the manufacture of hydrazinium diperchlorate would be a substantial advance in the art. Ideally, an improved preparative process would not be appreciably exothermic and would result in the preparation of a purer hydrazinium diperchlorate product substantially free from contaminants. Further, the perchlorate starting material would be available at relatively low cost in unlimited quantities.

It is therefore an object of this invention, among many others, to disclose a novel process for preparing hydrazinium diperchlorate.

It is a more specific object of this invention to prepare hydrazinium diperchlorate without using perchloric acid as a starting material.

An additional object of this invention is the preparation of hydrazinum diperchlorate relatively free from thermal decomposition products. Further objects are the preparation of low cost propellant grade hydrazinium diperchlorate without the hazards of an exothermic reaction.

The above objects, among others, are achieved by the inventive process described more fully below.

In practice, sodium perchlorate, HCl, water and hydrazine mono or disalts are combined in certain critical proportions and mixed to form a reaction mixture. The reaction mixture is heated until sodium chloride precipitates. The sodium chloride byproduct is filtered off and the filtrate cooled until hydrazinium diperchlorate precipitates out. The hydrazinium diperchlorate removed from the mother liquid is hydrated and is converted to the anhydrous form by establishing drying techniques.

In the preferred practice, approximately equimolar quantities of HCl and sodium perchlorate are slurried with sufficient water to yield supernatant of not less than 60% by weight perchloric acid. Hydrazinium dihydrochloride is added to the slurry with continued stirring. The quantity of hydrazine salt added is about ⅙ the molar concentration of the sodium perchlorate in the system. After slurrying the hydrazine salt into the reaction mixture, the reaction mixture is heated between about 50–60° C. until sodium chloride byproduct precipitates out. The precipitation occurs due to the presence of a saturated solution of salt and its relatively small increase in solubility at elevated temperatures. After removing the precipitate of salt, the reaction mixture filtrate contains a small amount of dissolved salt, a mother liquid of concentrated perchloric acid and dissolved hydrazinium diperchlorate product. The product is then cooled below about 25° C. until precipitation of product occurs. The filtrate is maintained at this temperature until precipitation of hydrazinium diperchlorate product ceases. The accumulated product is filtered off to yield hydrazinium diperchlorate as a purified hydrate. The hydrate is dried by the usual techniques to give the desired anhydrous form.

As indicated above, certain conditions such as reactant ratios and temperatures are critical to the inventive process. However, more latitude exists insofar as other conditions are concerned. To indicate the permissible variations, the following discussion is submitted.

The ratio of reactants can be varied as follows: 1 part of the hydrazine mono or disalt:5 parts or higher of sodium perchlorate:1 to 10 parts of HCl:0.5 to 5 parts of $H_2O$. Generally, the favored process embodiments are those in which the ratio of perchlorate to hydrazine salt is highest and the amount of water present is the lowest practical. This reaction environment can be assured by using at least a 40% excess of concentrated perchloric acid over what is required by stoichiometry to produce the diperchlorate salt. If this excess of acid is present initially, the concentration of the perchloric acid mother liquid after filtration of the salt is at least 50, preferably from about 50 to 72% by weight. The concentration of perchloric acid is especially important because the quantitative precipitation of the hydrazinium diperchlorate product will not readily take place even at lower temperatures unless at least this minimal concentration of perchlorate ion is present. Higher concentrations (up to 80% or higher) of perchlorate ion are not harmful and are limited mainly by economics.

An excess of HCl is not harmful as long as the water content is controlled so that the requisite minimal perchloric acid concentration is maintained. The HCl concentration can be increased without affecting water concentration by using gaseous HCl rather than the acid.

As indicated earlier, if the ratio of perchlorate ion to hydrazine salt and water content is within the required limits, the salt by-product will precipitate semiquantitatively between about 0° C. and 100° C. However, the range between about 40° C. to 0° C. is to be avoided because the solubility of the hydrazinium diperchlorate is greatly reduced. Since the success of the process to a large measure depends upon the differential solubility of hydrazinium diperchlorate and sodium chloride at lower and higher temperature, temperatures above 40° C. are necessary to minimize coprecipitation of hydrazinium diperchlorate.

Again, because of this same differential solubility, care must be taken to cool the filtrate from the sodium chloride precipitation step at least below 50° C., preferably between 50 to 60° C. to obtain maximum precipitation of hydrazinium diperchlorate. While hydrazinium diperchlorate is very soluble above 60° C. in a concentrated perchloric acid mother liquid, below these temperatures its solubility is relatively slight. Ordinarily, the hydrazinium diperchlorate precipitation is complete within 1 hour at −10° C., but longer standing time is not harmful.

The novel process of this invention is advantageous for several reasons. For instance, since the reaction used to produce hydrazinium diperchlorate product is one of double decomposition rather than an exothermic neutralization, less care need be taken in cooling the reaction mixture and substantially less product is lost through thermal decomposition. Moreover, since decomposition is minimized, the final product is substantially free from contaminants. When hydrazinium diperchlorate is used as a propellant oxidizer, close control of decomposition products in the oxidizer is essential for safe practice.

An important though not primary advantage of the inventive process is a savings in cost and availability of starting materials. Perchloric acid in its concentrated form is utilized in most neutralization processes. The material is costly and is prepared from sodium perchlorate. By preparing the concentrated perchloric acid in situ a substantial cost saving is effected in material costs. In addition, needless storage and handling of perchloric acid is omitted which also reduces process costs. Finally, because there is less material handling, the possibility of accidental contamination is reduced.

To more clearly set forth the advantages and workings of this invention, the following detailed embodiments are submitted:

In one embodiment of this invention, a reactor fitted with a heating and cooling means is charged with 3.44 parts by weight of hydrazinium monochloride, 38.29 parts by weight of sodium perchlorate, 26.1 parts by weight of a 36.7% by weight HCl in water solution and 6.63 parts by weight of distilled water. The reaction mixture is heated with stirring at 52–57° C. for 5 hours. The mixture is filtered hot to remove a first crop of sodium chloride crystals referred to as solid 1. The filtrate is cooled to 25° C. then filtered again to remove a second crop of sodium chloride (solid 2). The second solution is cooled to −10° C. and hydrazinium diperchlorate product (solid 3) and refiltered after standing for about an hour at −10° C. to give a final crop of hydrazinium diperchlorate (solid 4) hydride. Solids 1 and 2 are primarily sodium chloride and 3 and 4 are primarily hydrazinium diperchlorate. The hydrazinium diperchlorate is combined and dried under vacuum to give anhydrous hydrazinium perchlorate. This product can be shown to be substantially free from decomposition products and shows good thermal and vibrational stability.

In another embodiment, the above run is repeated except that only one filtration is made for NaCl after 1 hour heating at 50–60° C., and 1 filtration of hydrazinium diperchlorate is made after ½ hour standing at −15° C. The product is indistinguishable over that of the first embodiment.

In another embodiment, a reactor is charged with 10 parts by weight of hydrazine dichloride, 150 parts by weight of sodium perchlorate, 12 parts by weight of HCl gas and 15 parts by weight of distilled water. The reaction mixture is stirred and heated for 2 hours at 75° C. then filtered. The filtrate is cooled to −15° C. and stirred for an hour at this temperature then filtered. The hydrazinium diperchlorate product thus obtained is dried to its anhydrous form. The anhydrous product has good color and is substantially free from contaminants.

In a further embodiment, the above process is repeated in two runs substituting hydrazine mono and disulfate on a weight by weight basis for hydrazine dichloride.

As the foregoing discussion embodiments indicate, numerous modifications and changes can be made in the process conditions without departing from the inventive concept. The metes and bounds of this invention are best indicated by the claims which follow.

What is claimed is:

1. A process for preparing hydrazinium diperchlorate product by double decomposition comprising the steps of admixing a hydrazine salt selected from the group consisting of hydrazinium monohydrochloride, hydrazinium dihydrochloride, hydrazinium monosulfate, and hydrazinium disulfate, with sodium perchlorate and hydrogen chloride, in the presence of water, to form a reaction mixture slurry including perchloric acid and sodium chloride, heating said admixture of perchloric acid and sodium chloride until hydrazine diperchlorate is formed, removing the sodium chloride to form a filtrate, cooling the filtrate until hydrazinium diperchlorate is formed, and isolating the hydrazinium diperchlorate product.

2. A process for preparing hydrazinium diperchlorate product by double decomposition comprising the steps of admixing a hydrazine salt selected from the group consisting of hydrazinium monohydrochloride, hydrazinium dihydrochloride, hydrazinium monosulfate, and hydrazinium disulfate, with sodium perchlorate, hydrogen chloride, in the presence of water, to form a reaction mixture slurry including perchloric acid and sodium chloride, heating said admixture of perchloric acid and sodium chloride until hydrazine diperchlorate is formed, removing the solid sodium chloride to form a filtrate, cooling the filtrate until hydrazinium diperchlorate is formed, and isolating the hydrazinium diperchlorate product, said reactants being present in such proportion so that after removal of the sodium chloride, the concentration of the perchloric acid is at least 50% by weight and the ratio of the perchloric acid to the hydrazine salt exceeds that required by stoichiometry to convert all of the hydrazine salt present to the hydrazinium diperchlorate.

3. The process of claim 2 wherein the hydrazine salt is hydrazinium monohydrochloride.

4. The process of claim 2 wherein the hydrazine salt is hydrazinium dihydrochloride.

5. A process for preparing hydrazinium diperchlorate by double decomposition comprising the steps of admixing a hydrazine chloride selected from the group consisting of hydrazinium monohydrochloride, hydrazinium dihydrochloride, hydrazinium monosulfate, and hydrazinium disulfate, with sodium perchlorate and HCl reactants, in the presence of water, until a reaction mixture slurry including solid sodium chloride and perchloric acid is formed, heating said reaction mixture to at least 50° C. until hydrazinium diperchlorate is formed, removing said solid sodium chloride to form a reaction mixture filtrate, cooling the reaction mixture filtrate until solid hydrazinium diperchlorate precipitates, and removing the hydrazinium dipherchlorate product, said reactants in said reaction mixture slurry being present in sufficient proportions so that the initial concentration of the perchloric acid is at least 50% by weight and the ratio of the perchloric acid to the hydrazine chloride salt is in excess over that required by stoichiometry to convert the hydrazine chloride to hydrazinium diperchlorate.

References Cited
UNITED STATES PATENTS
3,131,997   5/1964   Stern _____ 149—36 X LELAND A. SEBASTIAN, Primary Examiner U.S. Cl. X.R.

149—36